Jan. 29, 1957        W. E. SLAVENS        2,779,148

ANTI-CLOGGING MEANS FOR CORN HARVESTERS

Filed April 21, 1954        2 Sheets-Sheet 1

*INVENTOR.*
WAYNE E. SLAVENS

BY

ATTORNEY

INVENTOR.
WAYNE E. SLAVENS
BY
*C. L. Parker*
ATTORNEY

United States Patent Office 2,779,148
Patented Jan. 29, 1957

2,779,148

ANTI-CLOGGING MEANS FOR CORN HARVESTERS

Wayne E. Slavens, Des Moines, Iowa, assignor to Deere Manufacturing Co., Dubuque, Iowa, a corporation of Iowa Application April 21, 1954, Serial No. 424,635

11 Claims. (Cl. 56—104)

This invention relates to a harvester and more particularly to improved agitator means operative in the gathering and conveying unit for such harvester.

A preferred embodiment of the invention is particularly adapted and finds maximum utility in a corn picker, a typical design of which includes a mobile frame adapted to advance over a field of stalk-borne corn. Such harvester normally has a gathering unit including a pair of laterally spaced apart, upright, fore-and-aft extending side sheets between which is mounted a pair of snapping rolls and a conveyor, the relation between the snapping rolls and the conveyor being such that ears detached from the stalks by the snapping rolls are transferred laterally to the conveyor to be conveyed rearwardly to husking mechanism or some other receptacle at the rear of the machine. Because of the varying conditions under which the crop grows, there are times when considerable clogging is experienced, particularly in the rear zone of transfer between the snapping rolls and the conveyor. Although agitating means are known in conjunction with the snapping rolls, it has been found that these are operative mainly to accentuate the clogging in some conditions, since normally the rear ends of the snapping rolls are assocaited with a transverse upright wall portion of the gathering unit housing and prior art agitators serve only to pack the crops against this wall rather than to effect transfer thereof to the crop conveyor. According to the present invention, operation of the agitator is confined to the zone directly above the conveyor so as to facilitate upward movement of the crops and therefore to keep a space open for lateral transfer of the crops from the snapping rolls to the conveyor.

Further objects of the invention reside in an improved design of agitator which may be readily mounted on and dismounted from a corn picker of conventional design; improved driving means for the agitator, particularly by means of a drive-transmitting connection between the lower run of the conveyor; and an over-all improved design providing a simple and economical agitator.

The foregoing and other important objects and desirable features inherent in and encompassed by the invention will become apparent from the following disclosure of a preferred embodiment of the invention as accomplished in the detailed description and accompanying sheets of drawings, the several figures of which are described immediately below.

Figure 1:
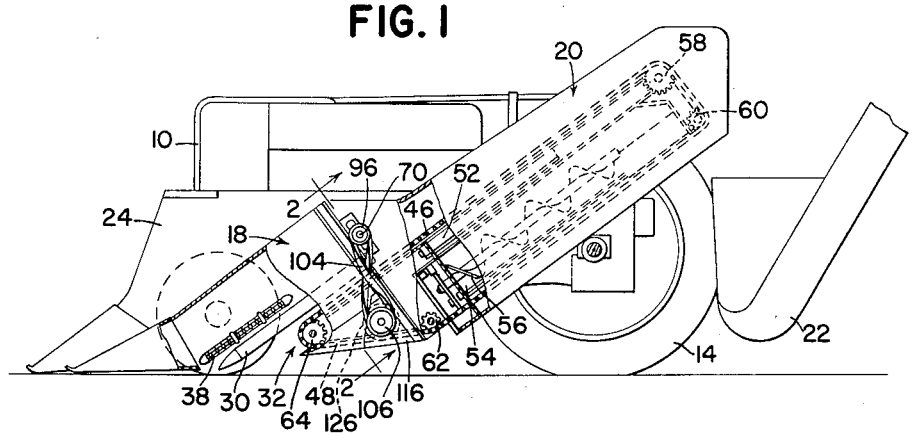
Fig. 1 is a side elevational view of a typical tractor-mounted corn picker, with portions of the external sheet structure broken away and portions in section to expose interior parts.
Figure 4:
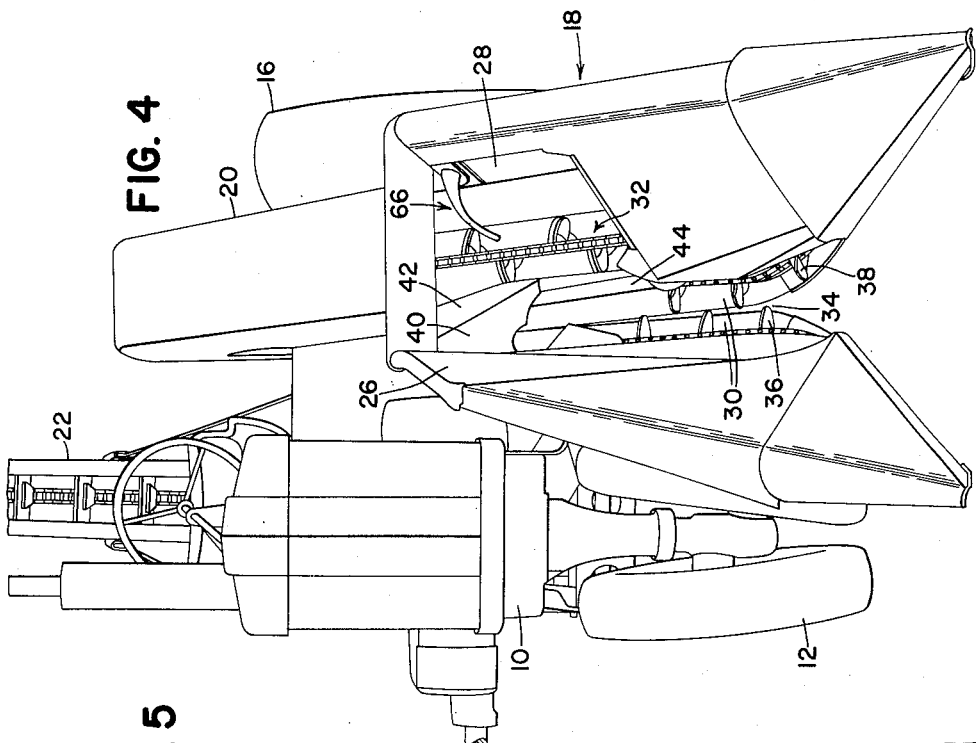
Fig. 4 is a perspective view from the front of the machine shown in Fig. 1, the view being substantially enlarged over that of Fig. 1.
Figure 5:
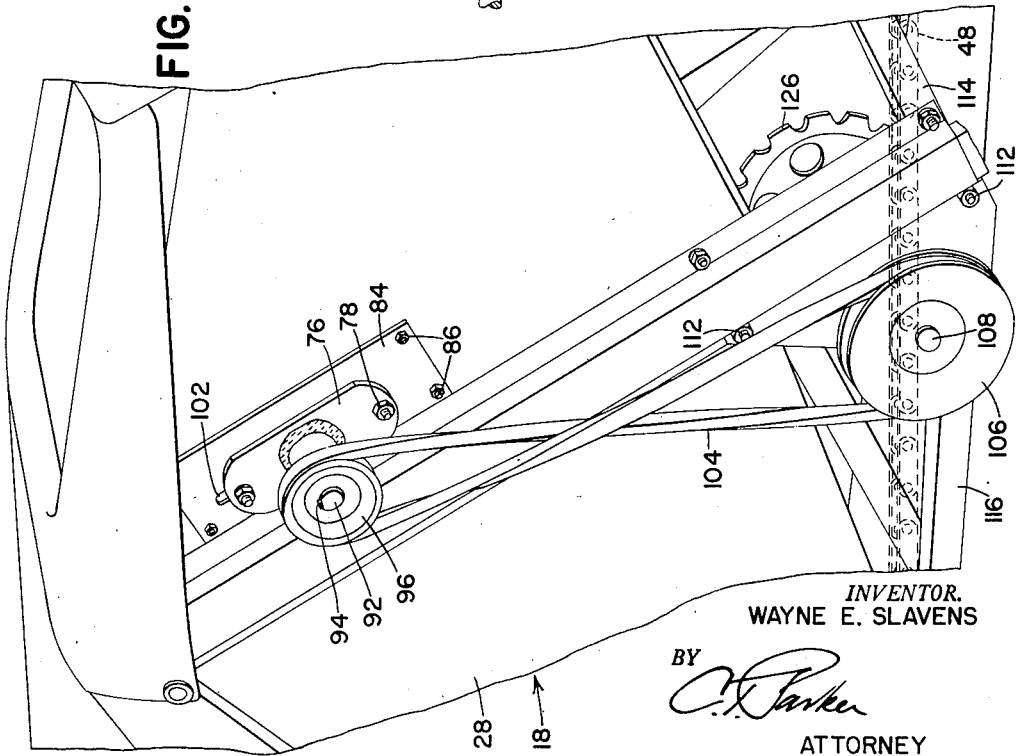
Fig. 5 is a considerably enlarged fragmentary perspective view showing the drive-transmitting means for the agitator.

The structure shown generally in Fig. 1 follows somewhat that forming the subject matter of the U. S. patent to Slavens 2,622,382. For present purposes, it may be assumed that any type of harvester is susceptible to having one form or another of the invention adapted thereto. The machine shown here includes a tractor having a longitudinal body 10 carried on front wheels 12 and a pair of laterally spaced rear traction wheels, the right-hand one of which appears at 14 in Fig. 1 and the left-hand one of which appears at 16 in Fig. 4. Mounted at one side of the tractor body 10 is a harvester comprising a forward gathering unit 18, a rearward husking unit 20 and a hopper and wagon elevator structure 22 just behind the rear or discharge end of the husking unit 20. Fig. 1 shows that the forward portion of the tractor body 10, as well as the front wheels 12, may be enclosed at 24 by what is commonly called a central divider. This structure has been omitted from Fig. 4 and on the whole is generally immaterial to the present disclosure.

Figure 2:
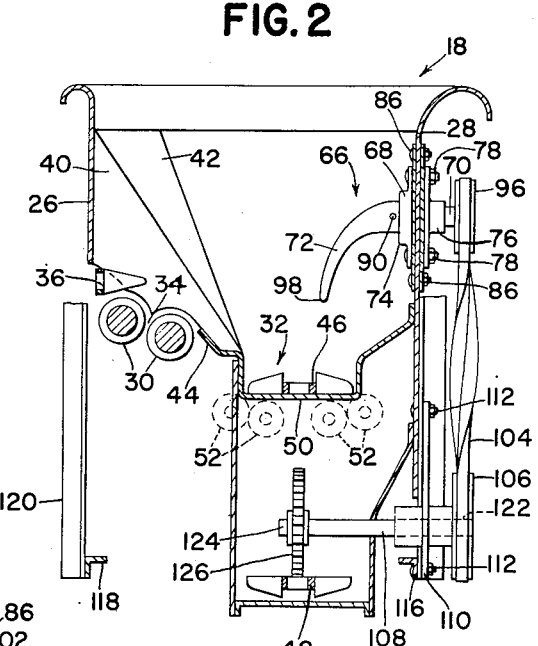
Fig. 2 is a transverse sectional view, on an enlarged scale, as seen substantially along the line 2—2 of Fig. 1.

The tractor serves as a power-propelled frame adapted to carry the gathering unit 18 for advance over a field of stalk-borne crops. The gathering unit includes first and second or inner and outer supports in the form of laterally spaced apart, upright, fore-and-aft extending side sheets 26 and 28, crop-detaching means including a pair of crop-detaching elements in the form of snapping rolls 30, which lie closely alongside the side sheet 26, and a rearwardly moving conveyor, forming part of the tractor-powered harvester drive mechanism and designated generally by the numeral 32, lying between the snapping rolls 30 and the second or outer side sheet 28. The crop-detaching elements or snapping rolls 30 define therebetween a stalk-receiving passageway 34 into which standing stalks pass as the machine advances over the field. Since, as best shown in Fig. 2, the snapping rolls 30 have their axes of rotation vertically offset, the rolls are operative to detach crops such as ears from the standing stalks and to cause the detached ears to move laterally to the conveyor 32, all of which is generally conventional.

Inner and outer gathering chains 36 and 38 cause standing stalks to move into the passageway 34 between the snapping rolls 30 as the machine advances. The snapping rolls, as is conventional, may have spiral lugs thereon (not shown here), which contribute to the rearward movement of the stalks and ears as well as effecting detachment of the ears from the stalks. The rear end of the gathering unit includes, just behind the rear ends of the snapping rolls 30, transverse upright wall structure 40 having a laterally and rearwardly directed portion 42. This structure, plus a longitudinally extending incline 44 alongside the outer snapping roll 30, causes the detached ears to move laterally to the conveyor 32 which, as will be seen, has its lower front end portion below and at the rear end of the outer gathering chain 38 (Fig. 1). The conveyor 32 is an endless chain and includes an upper run 46 and a lower run 48. The upper run operates in a trough 50 that parallels the snapping rolls 30 and that communicates at its rear end with the husking mechanism 20.

The husking unit 20 includes husking rolls 52, as conventional, which operate in the customary fashion to detach husks from the ears and to discharge the husks downwardly into a husk trough 54 in which operates a husk auger 56. The upper run of the conveyor chain 32 extends over the husking rolls 46 and continues downwardly and then forwardly around a pair of upper sprockets 58 and 60 so that the lower run 48 thereof travels forwardly beneath the husk trough 54, being thence supported by an idler sprocket 62 and a front supporting sprocket 64, an arrangement that achieves the advantages pointed out in the above-noted patent to Slavens. In the present instance, advantages of this design are appropriated for use in driving a crop agitator, designated generally by the numeral 66. This agitator, considered as a unit, whereby it is adapted for attachment to a conventional corn picker of the character disclosed, comprises a bearing 68, an agitator shaft 70 and an agitator finger 72. The bearing 68 comprises inner and outer parts 74 and 76 removably secured together, as by bolts 78, to journal the agitator shaft 70, an upper rear portion of the side sheet 28 being apertured at 80 to accommodate the arrangement. Inner and outer stiffener or reenforcing plates 82 and 84 are interposed respectively between the bearing parts 74 and 76 and the proximate surfaces of the second side sheet 28.

In an instance in which the agitator is furnished as original equipment with the picker, the side sheet 28 will be preformed with the aperture 80 therein. In cases in which the agitator is purchased as a separate item for attachment to an existing picker, it is a relatively simple matter to cut an opening such as 80 in the side sheet. The stiffener plates 84 are attached and permanently secured in place, as by bolts 86. The aperture 80 is preferably large enough to accommodate the connecting bolts 78 between the bearing parts 74 and 76 with room to spare so that the bearing 68 as a unit may be adjusted in a generally upright direction. Tightening of the nuts on the bolts 78 will fix the position of the agitator assembly.

Because of the arrangement just described, the agitator shaft 70 will extend through the bearing 68 so that it has an inner end 88, to which the agitator finger 72 is fixed, as by a pin 90, and an outer end 92 to which is releasably secured, as by a key 94, a rotary input member in the form of a V-belt sheave 96. Hence, the agitator finger 72 is inwardly and the sheave 96 is outwardly of the side sheet 28. When the sheave 96 is axially outwardly removed from the outer end of the agitator shaft and the bearing parts 74 and 76 are separated, the agitator, agitator shaft and inner bearing part may be removed axially inwardly as a unit.

The finger 72 extends generally radially from the agitator shaft 70, being of curved configuration laterally of the gathering unit and having a free end portion 98 operative in a circular path that lies generally in an upright fore-and-aft plane intersecting the conveyor 32. In other words, the inward extent of the agitator finger 72 is such that it terminates short of the snapping rolls 30 and therefore its operation is confined to a zone directly over the portion of the conveyor 32 approximately in transverse alinement with the rear wall 40 and rear wall angle extension 42. Thus, as the snapping rolls tend to propel the material rearwardly against the wall and the walls tend to deflect the material laterally, the tendency of the material to clog at that point is eliminated because of the rotary action of the agitator 66. Since the agitator is located above the conveyor rather than above the snapping rolls, it is in a position to accept and disintegrate the laterally directed material transferred by the walls 40 and 42. Therefore, a clogging condition in this zone is virtually impossible. The configuration of the agitator is such that material cannot collect thereon, the finger 72 being tapered toward its free end 98.

In connection with the adjustability of the agitator assembly because of the size of the aperture or opening 80 in the side sheet 28, it should be noted that the stiffener plates 82 and 84 are also slotted, as at 100 and 102, to permit adjustment of the assembly for the purposes of varying the tension in a drive-transmitting connection in the form of a V-belt 104 that connects the agitator drive sheave 96 with a drive member in the form of a second V-belt sheave 106 keyed to a transverse input shaft 108 positioned at a lower portion of the gathering unit 18.

Figure 3:
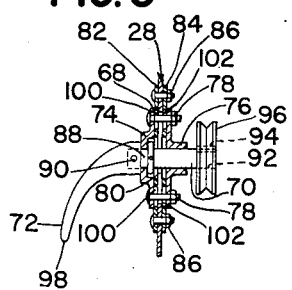
Fig. 3 is an enlarged fragmentary sectional view of the agitator and its mounting.

The shaft 108 is journaled in a bearing bracket 110 secured, as by bolts 112, between a lower portion of the side sheet 28 and associated frame structure in the form of angle members 114 and 116, these angle members forming part of the original gathering unit structure. Another angle member 118 and its associated support 120 for the inner portion of the unit 18 are visible in Fig. 3. The disposition of the bearing bracket 110 mounts the shaft 108 so that the shaft has an outer end 122 in substantial vertical alinement with the agitator sheave 96 and an inner end 124 in proximity to the lower run 48 of the conveyor. The sheave 106 is keyed to the outer end 122 and a drive member in the form of a sprocket 126 is keyed to the inner end 124 of the shaft 108 and engages or meshes with the lower run 48 of the conveyor 32. Thus, the shaft 108 and consequently the agitator 66 are driven from what would otherwise be an idle or return run of the conveyor 32. As will be seen in the drawings, the lower run 48 is spaced below the conveyor trough 50 and the space for accommodating the sprocket 126 is ample. When the agitator and its drive are furnished as extra equipment, the drive mechanism may be readily mounted on the existing structure, as will be obvious.

Various other features and advantages of the invention, not specifically enumerated herein, will undoubtedly occur to those conversant with the art to which the present invention relates, and such features and various modifications of the disclosed invention may be readily achieved without departure from the spirit and scope of the invention.

What is claimed is:

1. In a harvester having a frame adapted to advance over a field of stalk-borne crops and including a gathering unit having first and second laterally spaced apart, upright, fore-and-aft extending side sheets, a pair of crop-detaching elements lying closely along the first side sheet, a fore-and-aft extending crop-receiving trough lying between said elements and the second side sheet, and drive mechanism including an endless chain conveyor having a rearwardly moving upper run operating in the trough and a forwardly moving lower run operating below the trough, said elements defining between them a stalk-receiving passageway and being operative to detach crops from received stalks and to cause such detached stalks to move laterally to the trough, the improvement comprising: a bearing carried by a rear part of the second side sheet at a level above the upper run of the conveyor; a crop agitator movably carried by the bearing between the side sheets and in close proximity to the second side sheet so as to be operative only above the upper run of the conveyor to the exclusion of the crop-detaching elements; an agitator shaft journaled in the bearing and connected to the agitator, the second side sheet being apertured and said shaft extending laterally therethrough to have an outer end portion outside the second side sheet; and drive means external to the second side sheet and including a drive member engaging the lower run of the conveyor.

2. The invention defined in claim 1, in which: the agitator comprises a single finger secured to the shaft and extending generally radially therefrom.

3. The invention defined in claim 2, in which: the finger is of curved configuration laterally of the gathering unit and has a free end portion operative generally in an upright fore-and-aft plane intersecting the conveyor.

4. In a harvester having a frame adapted to advance over a field of stalk-borne crops and including a gathering unit having first and second laterally spaced apart, upright, fore-and-aft extending side sheets, a pair of crop-detaching elements lying closely along the first side sheet, a fore-and-aft extending crop-receiving trough lying between said elements and the second side sheet, and drive mechanism including an endless chain conveyor having a rearwardly moving upper run operating in the trough and a forwardly moving lower run operating below the trough, said elements defining between them a stalk-receiving passageway and being operative to detach crops from received stalks and to cause such detached stalks to move laterally to the trough, the improvement comprising: a bearing carried by a rear part of the second side sheet at a level above the upper run of the conveyor; a crop agitator movably carried by the bearing between the side sheets; an agitator shaft journaled in the bearing and connected to the agitator, the second side sheet being apertured and said shaft extending laterally therethrough to have an outer end portion outside the second side sheet; and drive means external to the second side sheet and including a drive member engaging the lower run of the conveyor.

5. The invention defined in claim 4, in which: the drive means includes a transverse input shaft below the conveyor trough and having an inner end proximate to the lower run of the conveyor and an outer end in substantial vertical alinement with the outer end of the agitator shaft; bracket means journaling the input shaft on the gathering unit; a rotary drive member secured to the inner end of the input shaft and meshing with the lower run of the conveyor; and a drive-transmitting connection between the outer end of the input shaft and the outer end of the agitator shaft.

6. The invention defined in claim 4, in which: the drive means includes an input member releasably carried by the outer end portion of the agitator shaft for axially outward removal from said shaft, the bearing includes inner and outer separable parts detachably secured together respectively at the inner and outer surfaces of the second sheet, and the agitator and agitator shaft are inwardly removable as a unit with the inner bearing part after removal of said input member.

7. The invention defined in claim 6, in which: the bearing further includes inner and outer stiffener plates interposed respectively between the bearing parts and the proximate surfaces of said second side sheet.

8. In a harvester having driving mechanism and a frame adapted to advance over a field of stalk-borne crops and including a gathering unit having first and second laterally spaced apart, upright, fore-and-aft extending side sheets, a pair of crop-detaching elements lying closely along the first side sheet and a rearwardly moving conveyor lying between said elements and the second side sheet, said elements defining between them a stalk-receiving passageway and being operative to detach crops from received stalks and to cause such detached stalks to move laterally to the conveyor, the improvement comprising: a support carried solely by a rear part of the second side sheet and above the conveyor; a crop agitator movably mounted on said support and extending laterally therefrom toward the first side sheet but terminating short of the crop-detaching elements so as to be operative directly above the conveyor; and drive means connecting the agitator to the harvester driving mechanism.

9. The invention defined in claim 8, in which: the support comprises a bearing; the agitator comprises a transverse shaft journaled in the bearing and a single generally radial finger secured to the shaft.

10. The invention defined in claim 9, in which: the finger is of curved configuration laterally of the gathering unit and has a free end portion operative generally in an upright fore-and-aft plane intersecting the conveyor.

11. In a harvester having a frame adapted to advance over a field of stalk-borne crops and including first and second laterally spaced apart, fore-and-aft gathering supports between which upwardly and rearwardly inclined crop-detaching elements operate to handle crops received between the supports, and drive mechanism including an endless conveyor between the supports and having a rearwardly and upwardly moving upper run proximate and in crop-handling relationship to the crop-detaching means and a forwardly and downwardly moving lower run relatively remote from and out of crop-handling relationship to the crop-detaching means, the improvement comprising: a transverse agitator shaft journaled in one of the gathering supports at a level above the upper run of the conveyor and extending over the conveyor and inwardly toward the other support, said shaft having an outer portion outwardly of said one support; a crop agitator on the shaft between the supports to engage crops received by the crop-detaching means; and drive means outwardly of said one support and connected to the outer portion of said shaft and including a drive member engaging and driven by the lower run of the conveyor.

References Cited in the file of this patent

UNITED STATES PATENTS

| | | |
|---|---|---|
| 1,706,923 | Rosenthal | Mar. 26, 1929 |
| 1,821,985 | Peterson | Sept. 8, 1931 |
| 1,925,077 | Lindgren et al. | Aug. 29, 1933 |
| 2,622,382 | Slavens | Dec. 23, 1952 |
| 2,631,420 | Fergason | Mar. 17, 1953 |